(12) United States Patent
Tanaka

(10) Patent No.: US 10,316,517 B2
(45) Date of Patent: Jun. 11, 2019

(54) CONTINUOUS FIBER REINFORCING MATERIAL TENSION APPARATUS, CONTINUOUS FIBER REINFORCING MATERIAL TENSION METHOD, AND WEDGE BODY

(71) Applicant: TOKYO ROPE MANUFACTURING CO., LTD., Chuo-ku, Tokyo (JP)

(72) Inventor: Toru Tanaka, Tokyo (JP)

(73) Assignee: TOKYO ROPE MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 15/847,017

(22) Filed: Dec. 19, 2017

(65) Prior Publication Data

US 2018/0106042 A1    Apr. 19, 2018

Related U.S. Application Data

(63) Continuation of application No. PCT/JP2015/067767, filed on Jun. 19, 2015.

(51) Int. Cl.
*E04C 5/12* (2006.01)
*E04G 21/12* (2006.01)
(Continued)

(52) U.S. Cl.
CPC ............ *E04C 5/122* (2013.01); *B28B 23/043* (2013.01); *B29C 70/00* (2013.01); *E01D 19/14* (2013.01);
(Continued)

(58) Field of Classification Search
CPC . E04C 5/122; E04C 5/127; E04C 5/12; E04C 5/125; E04C 5/165; B29C 70/00;
(Continued)

(56) References Cited

U.S. PATENT DOCUMENTS 2,871,554 A * 2/1959 Siegfried .............. B28B 23/043
                                                              264/228
3,412,511 A * 11/1968 Dietrich .................. E04C 5/122
                                                              24/122.6
(Continued)

FOREIGN PATENT DOCUMENTS

CN            1620345 A        5/2005
CN         201020804 Y        2/2008
(Continued)

OTHER PUBLICATIONS

English Language Translation & Original JP Office Action, dated Aug. 21, 2018.
(Continued)

*Primary Examiner* — Brent W Herring
(74) *Attorney, Agent, or Firm* — Dickinson Wright PLLC

(57) ABSTRACT

The continuous fiber reinforcing material tension apparatus includes a pressing body that presses a sleeve to a side of a fixed structure and contains a hollow portion, in which a wedge body is allowed to reciprocate along a continuous fiber reinforcing material, a cylindrical bracket located in an opposite side of the sleeve from the pressing body and having an inner wall surface on which a projection is formed, a columnar rotary jig that is allowed to reciprocate inside the bracket, that engages with an end face of the wedge body, that has a spiral key groove that engages with a key, and that applies rotative force around an axis of the continuous fiber reinforcing material, and a piston that presses an end face of the rotary jig to a side of the fixed structure.

4 Claims, 6 Drawing Sheets

(51) Int. Cl.
   *B28B 23/04*  (2006.01)
   *E01D 19/16*  (2006.01)
   *E01D 19/14*  (2006.01)
   *B29C 70/00*  (2006.01)

(52) U.S. Cl.
   CPC .............. *E01D 19/16* (2013.01); *E04C 5/127* (2013.01); *E04G 21/12* (2013.01); *E04G 21/123* (2013.01)

(58) Field of Classification Search
   CPC ....... E01D 19/14; E01D 19/16; B28B 23/043; E04G 21/12; E04G 21/121; E04G 21/123
   USPC .................. 52/223.1, 223.6, 223.13, 223.14
   See application file for complete search history.

(56) References Cited

U.S. PATENT DOCUMENTS

| | | | | |
|---|---|---|---|---|
| 3,422,501 A * | 1/1969 | Kimio | ................ | E04C 5/122 24/122.6 |
| 3,647,184 A * | 3/1972 | Vanderhurst | .......... | E04G 21/121 254/29 A |
| 3,795,949 A * | 3/1974 | Shorter | ................ | E04C 5/122 24/115 R |
| 3,801,067 A * | 4/1974 | Shorter | ................ | E04C 5/122 254/29 A |
| 4,150,473 A * | 4/1979 | Dietrich | ................ | E04C 5/125 29/461 |
| 4,598,897 A * | 7/1986 | Aikioniemi | .......... | E04G 21/121 254/29 A |
| 5,594,977 A * | 1/1997 | McCallion | .......... | E04G 17/0707 24/115 M |
| 6,283,451 B1 * | 9/2001 | Stankus | ................ | E04G 21/121 254/228 |
| 6,513,287 B1 * | 2/2003 | Sorkin | ................ | E04C 5/122 24/122.6 |
| 7,819,388 B2 * | 10/2010 | McCallion | .......... | E02D 5/808 24/136 B |
| 7,841,061 B1 * | 11/2010 | Sorkin | ................ | E04C 5/122 24/122.3 |
| 2007/0175128 A1 * | 8/2007 | McCallion | .......... | E02D 5/808 52/223.13 |
| 2018/0179756 A1 * | 6/2018 | Schmidt | ................ | E04C 5/122 |
| 2018/0291628 A1 * | 10/2018 | Butts | ................ | E04C 5/125 |

FOREIGN PATENT DOCUMENTS

| | | |
|---|---|---|
| CN | 201162311 Y | 12/2008 |
| CN | 103556785 A | 2/2014 |
| JP | 61-161326 | 10/1986 |
| JP | 0742310 A | 2/1995 |
| JP | 9-136313 | 5/1997 |
| JP | 11-81555 A | 3/1999 |
| JP | 1181555 A | 3/1999 |

OTHER PUBLICATIONS

English Language Translation & Original JP PCT Written Opinion, dated Sep. 8, 2015.

English Language Translation & Original JP PCT ISR, dated Sep. 8, 2015.

Office Action dated Jan. 2, 2019 for counterpart Chinese Patent Application No. 201580080999.8.

* cited by examiner

CONTINUOUS FIBER REINFORCING MATERIAL TENSION APPARATUS, CONTINUOUS FIBER REINFORCING MATERIAL TENSION METHOD, AND WEDGE BODY

CROSS-REFERENCE TO RELATED APPLICATIONS

This application is a Continuation Application of PCT Application No. PCT/JP2015/067767, filed Jun. 19, 2015, the entire contents of which is incorporated herein by reference.

FIELD OF THE INVENTION

The present invention relates to a continuous fiber reinforcing material tension apparatus, a continuous fiber reinforcing material tension method, and a wedge body, for use in fixing an end of a continuous fiber reinforcing material used to reinforce a structure in a field of civil engineering, bridge construction, etc.

BACKGROUND

Continuous fiber reinforcing materials are known as alternatives to PC stranded wires. A continuous fiber reinforcing material is formed by compounding continuous fiber, such as carbon fiber, with a thermoset resin, such as an epoxy resin to be a composite wire, and stranding composite wires into, for example, a 1×7 strand. A continuous fiber reinforcing material has a high tensile strength and a high elasticity constant, like a PC stranded wire, and is characterized by its light weight and stainless properties. A continuous fiber reinforcing material is used as a mending cable for an existing bridge, a tendon for reinforcing a pre-stressed concrete girder and a pile, a reinforcing material for a bridge girder made by a post-tension method, etc. in the field of civil engineering, bridge construction, etc. When a continuous fiber reinforcing material is used for the above-described purposes, end fixing for holding both ends of the continuous fiber reinforcing material is necessary to tension the continuous fiber reinforcing material.

As an end fixing structure for a PC stranded wire, a known fixing tool includes a wedge body that has a cylindrical shape having an outer diameter that increases from a front end receiving a tensile force toward a rear end of a terminal side, and a sleeve that is provided on an outer periphery of the wedge body and that has a conical hollow internal structure having a diameter that increases toward the rear end of the terminal side.

The sleeve is attached to a PC stranded wire in advance, and the wedge body is inserted into the sleeve to form the fixing tool. Then, a tension apparatus is set to the fixing tool. When the PC stranded wire is tensioned, the wedge body separates from the sleeve because it moves together with the PC stranded wire. After a target tensile force is obtained, the wedge body is pushed into the sleeve by a hydraulic piston while maintaining the tensile force. The PC stranded wire is pulled from a fixed structure side with strong force, and the wedge body is engaged into the sleeve. When the tensile force by the tension apparatus is released, the PC stranded wire is fixed with a strong force.

In another known structure, a sleeve provided with a male screw on an outer peripheral surface thereof is held in a fixed structure, and then a portion projected from the fixed structure is fixed with a lock nut (for example, Jpn. Pat. Appln. KOKAI Publication No. 9-136313).

The fixing tool or the fixing method as described above may be applied to a continuous fiber reinforcing material.

SUMMARY

The aforementioned end fixing structure for a continuous fiber reinforcing material has problems described below. There is a case where a shape of an outer surface of the continuous fiber reinforcing material is transferred to an inner wall surface of the wedge body. In this case, an engaged portion to be engaged with the outer surface of the continuous fiber reinforcing material is formed in the inner wall surface. This strengthens the fixing between the continuous fiber reinforcing material and the wedge body. However, when the wedge body temporarily separates from the sleeve by tension and then the wedge body is pushed into the sleeve, there is a possibility that the wedge body cannot be moved, because the engaged portion is engaged with the outer surface of the continuous fiber reinforcing material. Furthermore, there is a problem that the continuous fiber reinforcing material may be damaged when the wedge body is forcibly pushed into the sleeve by a hydraulic piston.

Therefore, an object of the present invention is to provide a continuous fiber reinforcing material tension apparatus, a continuous fiber reinforcing material tension method and a wedge body used therein, which allow the wedge body to be reliably secured to a fixed structure by moving the wedge body along the continuous fiber reinforcing material, even if a shape of an outer surface of the continuous fiber reinforcing material is transferred to an inner wall surface of the wedge body, and an engaged portion to be engaged with the outer surface of the continuous fiber reinforcing material is formed in the inner wall surface.

A continuous fiber reinforcing material tension apparatus that sets a fixing tool to fix a continuous fiber reinforcing material formed by stranding composite wires of continuous fiber to a fixed structure in a tensioned state, the fixing tool including: a wedge body that is provided in a terminal side of the continuous fiber reinforcing material and that has a cylindrical shape having an outer diameter that increases from a front end receiving a tensile force toward a rear end of the terminal side, a shape of an outer surface of the continuous fiber reinforcing material being transferred to an inner wall surface of the wedge body to form an engaged portion to be engaged with the outer surface of the continuous fiber reinforcing material; and a sleeve that is provided on an outer periphery of the wedge body and that has a conical hollow internal structure having a diameter that increases toward the rear end of the terminal side, the continuous fiber reinforcing material tension apparatus comprising a pressing body that presses the sleeve to a side of the fixed structure and that contains a hollow portion, in which the wedge body is allowed to reciprocate along the continuous fiber reinforcing material, a cylindrical bracket located in an opposite side of the sleeve from the pressing body, and having an inner wall surface on which a projection is formed, a columnar rotary jig that is allowed to reciprocate inside the bracket, that engages with an end face of the wedge body, that has a spiral groove which engages with the projection, and that applies rotative force around an axis of the continuous fiber reinforcing material, and a piston that presses an end face of the rotary jig to the side of the fixed structure.

DETAILED DESCRIPTION

An embodiment of the present invention is described below with reference to the accompanying drawings.

Figure 1:
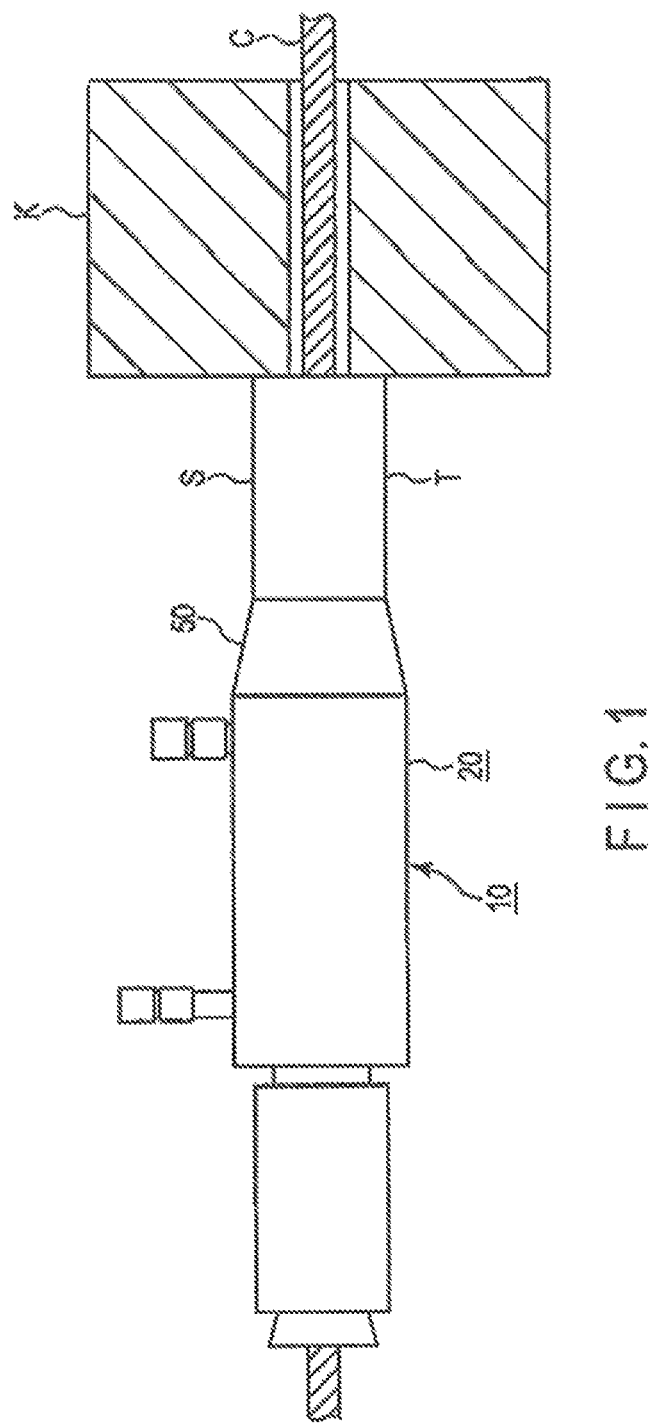
FIG. 1 is a side view showing a state of attaching a continuous fiber reinforcing material by a continuous fiber reinforcing material tension apparatus according to an embodiment of the present invention.
Figure 2:
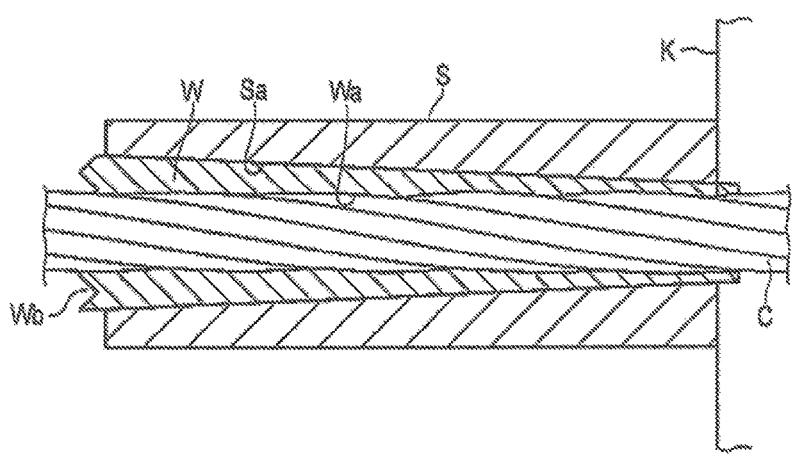
FIG. 2 is a longitudinal cross-sectional view showing an end fixing tool used for the continuous fiber reinforcing material tension apparatus.
Figure 3:
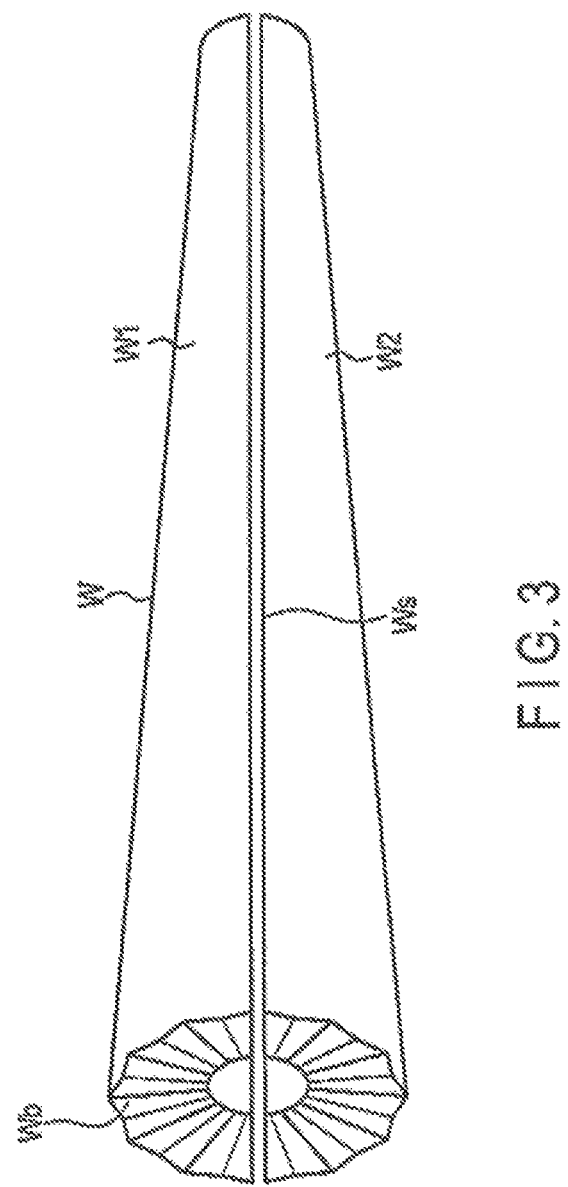
FIG. 3 is a perspective view showing a wedge body of the end fixing tool.
Figure 4:
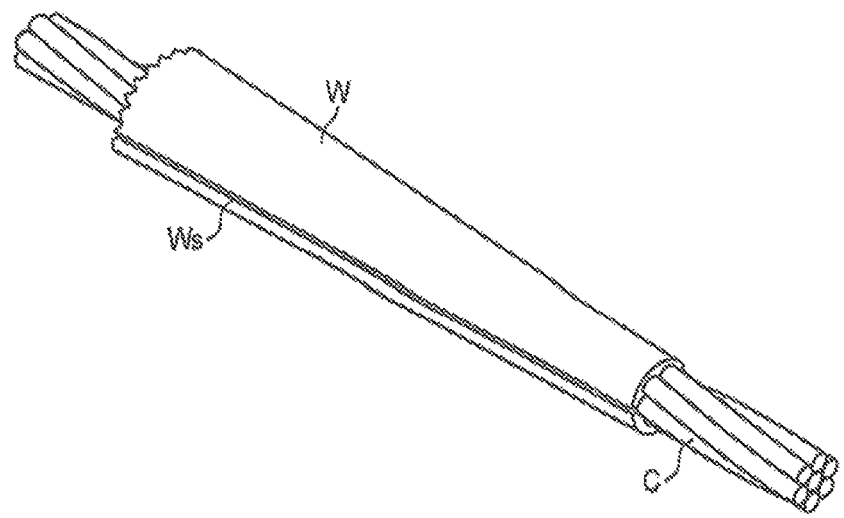
FIG. 4 is a perspective view showing a continuous fiber reinforcing material to which the wedge body is attached.
Figure 5:
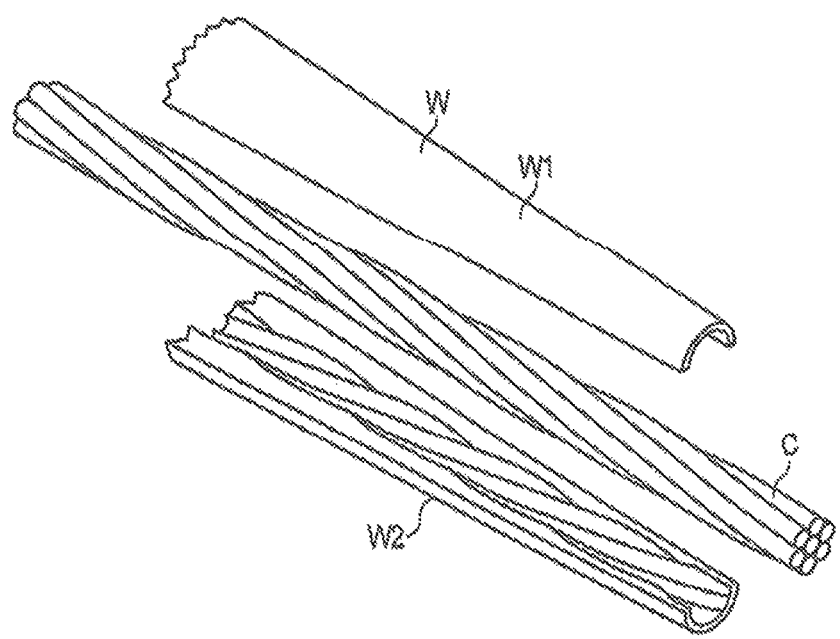
FIG. 5 is an exploded perspective view showing the end fixing tool and the wedge body.
Figure 6:
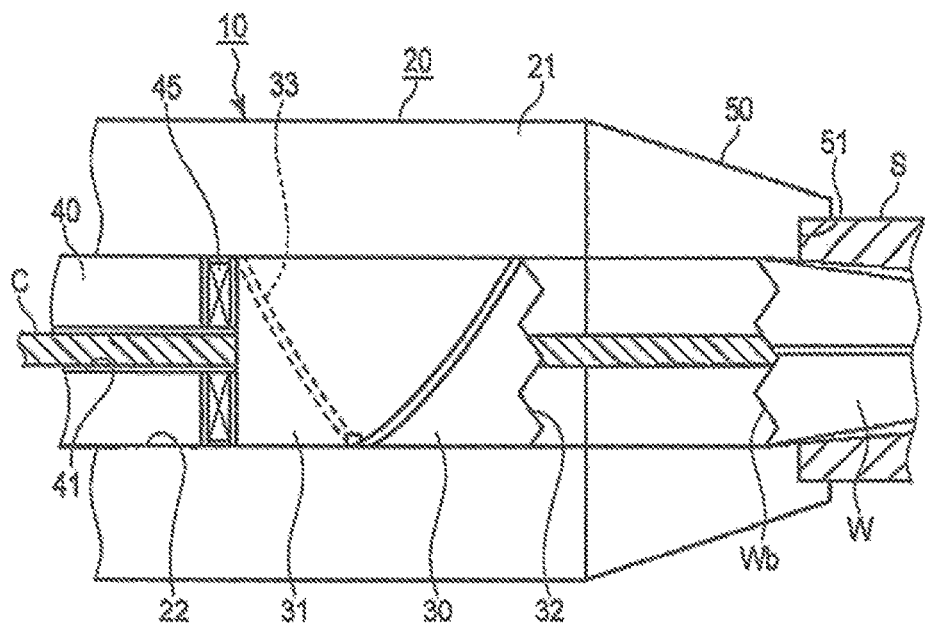
FIG. 6 is a cross-sectional view showing a main part of the continuous fiber reinforcing material tension apparatus.
Figure 7:
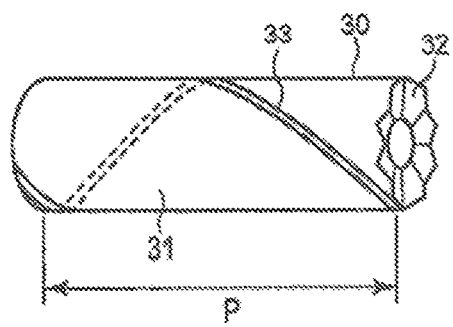
FIG. 7 is a perspective view showing a rotary jig incorporated in the continuous fiber reinforcing material tension apparatus.
Figure 8:
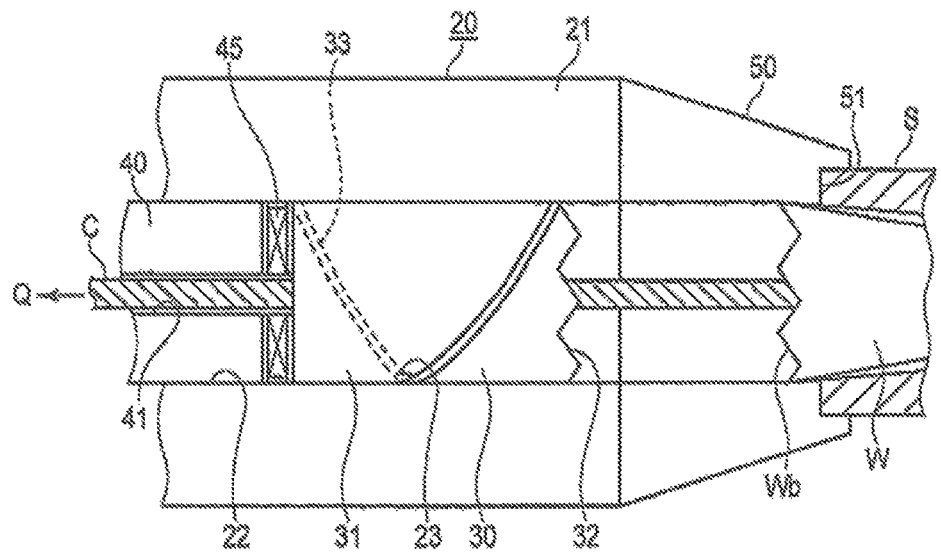
FIG. 8 is a cross-sectional view showing a tension operation in the continuous fiber reinforcing material tension apparatus.
Figure 9:
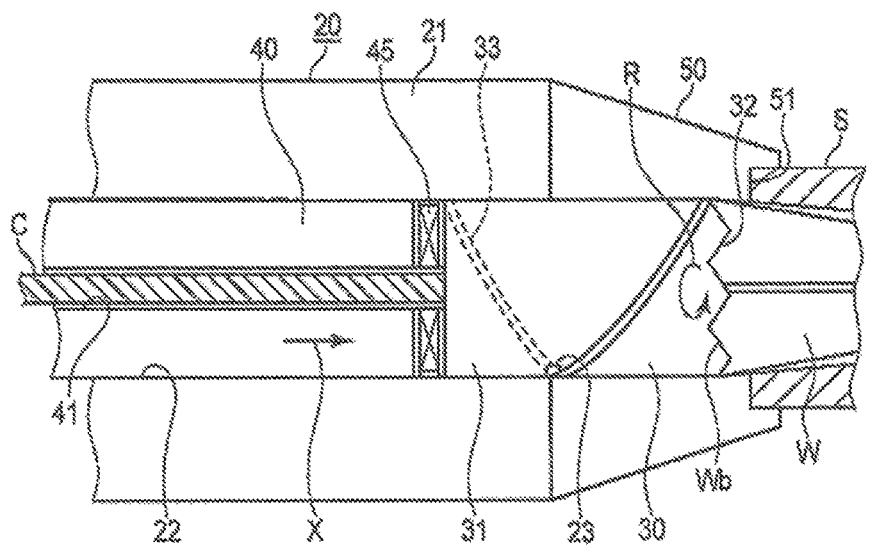
FIG. 9 is a cross-sectional view showing a wedge body screwing operation of in the continuous fiber reinforcing material tension apparatus.

FIG. 1 is a side view showing a state of attaching a continuous fiber reinforcing material C by a continuous fiber reinforcing material tension apparatus 10 according to an embodiment of the present invention. FIG. 2 is a longitudinal cross-sectional view showing an end fixing tool T used for the continuous fiber reinforcing material tension apparatus 10. FIG. 3 is a perspective view showing a wedge body W of the end fixing tool T. FIG. 4 is a perspective view showing a continuous fiber reinforcing material C to which the wedge body W is attached. FIG. 5 is an exploded perspective view showing the end fixing tool T and the wedge body W. FIG. 6 is a cross-sectional view showing a main part of the continuous fiber reinforcing material tension apparatus 10. FIG. 7 is a perspective view showing a rotary jig 30 incorporated in the continuous fiber reinforcing material tension apparatus 10. FIG. 8 is a cross-sectional view showing a tension operation in the continuous fiber reinforcing material tension apparatus 10. FIG. 9 is a cross-sectional view showing a wedge body W screwing operation in the continuous fiber reinforcing material tension apparatus 10.

In the drawings, K represents a fixed structure, C a continuous fiber reinforcing material, T an end fixing tool, S a sleeve, and W a wedge body. The continuous fiber reinforcing material C is formed by compounding continuous fiber, such as carbon fiber, with a matrix resin (representatively, a thermoset resin, such as an epoxy resin) to be a composite wire, and. stranding composite wires. For example, in general, a plurality of side wires are stranded around one core wire. A distance in an axial direction between a point of a side wire and a point where the side wire returns to the same position in the circumferential direction is referred to as one pitch (P). In the following description, the axial direction represents a direction in which the continuous fiber reinforcing material C extends. A front end portion represents a side of the fixed structure K, and a terminal side represents a side apart from the fixed structure K.

The end fixing tool T includes the wedge body W that is attached to the terminal side of the continuous fiber reinforcing material C and that has a cylindrical shape having an outer diameter that increases from a front end receiving a tensile force toward a rear end of the terminal side, and includes the sleeve S that is provided on an outer periphery of the wedge body W and that has a conical hollow internal structure having a diameter that increases toward the rear end of the terminal side.

The wedge body W is formed in a hollow, circular truncated cone by combining divided wedge bodies W1 and W2, which are formed as two halves in a circumferential direction. The divided wedge bodies W1 and W2 have inner wall surfaces, on which irregularities that fit with an outer shape of the continuous fiber reinforcing material C are formed. As a result, a high frictional force can be achieved between the continuous fiber reinforcing material C and the wedge body W. In the drawings, Ws represent a gap between the divided wedge bodies W1 and W2 that are combined. Because of its half-divided structure as described above, the wedge body W can be attached to any desired position of the continuous fiber reinforcing material C. After the attachment, the wedge body W covers the entire circumference of the continuous fiber reinforcing material C, and has an outer shape that is an approximate circular truncated cone shape. An end face of the wedge body W has irregularities (engaged portion) Wb, which are engaged with irregularities 32 of the rotary jig 30 to be described later.

As shown in FIG. 6, the continuous fiber reinforcing material tension apparatus 10 includes a drive unit 20, and a pressing body 50 provided on the end fixing tool T side of the drive unit 20.

The drive unit 20 includes a cylindrical bracket 21 whose central line coincides with the axial direction, a hollow portion 22 provided in the bracket 21, the rotary jig 30 configured to reciprocate along the axial direction inside the hollow portion 22, and a piston 40 that hydraulically presses the rotary jig 30 toward the right in FIG. 1.

A key 23 to engage in a key groove 33 (to be described later) is formed on an inner wall surface of the hollow portion 22. The rotary jig 30 includes a columnar main body 31, and the key groove 33 which is a spiral groove formed in an outer peripheral surface of the main body 31 and in which the key 23 engages. The distance which the key groove 33 moves while making a round on the outer circumference of the main body 31 is set to be the same as one pitch of the continuous fiber reinforcing material C.

Thus, when the rotary jig 30 is pressed by the piston 40, the key 23 moves along the key groove 33, thereby applying rotative force to the main body 31. The irregularities (engaging portion) 32 are formed at a right end of the rotary jig 30 in FIG. 6. The irregularities 32 include a plurality of grooves extending in radial directions, and engage with the irregularities Wb of the 5 wedge body W, so that the rotative force of the rotary jig 30 is transmitted to the wedge body W.

A through hole 41 is formed inside the piston 40, and allows the continuous fiber reinforcing material C to be 10 inserted therethrough. A bearing 45 is arranged between the piston 40 and the rotary jig 30. Because of the bearing 45, friction generated between the rotary jig 30 and the piston 40 can be low, and the rotary jig 30 can be rotated smoothly.

The pressing body 50 is arranged between the drive unit 20 and the end fixing tool T, and has a cylindrical shape whose outer diameter reduces from the drive unit 20 side toward the end fixing tool T side. A pressing portion 51 that presses an end face of the sleeve S is formed at the right end of the pressing body 50 in FIG. 6. The pressing body 50 contains a hollow portion 52, in which the wedge body W can be reciprocated.

The continuous fiber reinforcing material C is attached to the fixed structure K in a tensioned state by the continuous fiber reinforcing material tension apparatus 10 described above. More specifically, the continuous fiber reinforcing material C is inserted into a hole Ka of the fixed structure K, and then the sleeve 50 is put around the outer periphery of the continuous fiber reinforcing material C. Then, the sleeve S is moved until the right end thereof in FIG. 1 is brought into contact with the fixed structure K. The wedge body W is fit around the continuous fiber reinforcing material C with the front end being directed to the sleeve S side to form the wedge body W. Then, the wedge body W is screwed into the sleeve S to be fit therein, thereby forming the end fixing tool T.

Next, the pressing portion 51 of the pressing body 50 of the continuous fiber reinforcing material tension apparatus 10 is pressed against the left end of the sleeve S. In this state, the continuous fiber reinforcing material C is tensioned in a direction of an arrow Q in FIG. 8 by means of the drive unit 20 or the like. At this time, the wedge body W is pulled leftward as shown in FIG. 8, separates from the sleeve S, and enters the hollow portion 52. Since the end fixing tool T cannot function when the wedge body W separates from the sleeve S, an operation to return the wedge body W into the sleeve S is carried out.

The piston 40 is moved by the drive unit 20 in a direction of an arrow X in FIG. 9. As a result, the rotary jig 30 pressed by the piston 40 moves in the direction of the arrow X in FIG. 9. At this time, since the key 23 engages in the key groove 33 of the rotary jig 30, a rotative force around the axial direction is applied to the main body 31. Furthermore, the irregularities 32 of the rotary jig 30 engage with the irregularities Wb of the wedge body W, so that the rotative force of the rotary jig 30 is transmitted to the wedge body W.

The wedge body W is screwed around the continuous fiber reinforcing material C while rotating, and held into the sleeve S, thereby forming the end fixing tool T. The distance which the key groove 33 moves while making a round on the outer circumference of the main body 31 is set to be the same as one pitch of the continuous fiber reinforcing material C. Therefore, the force that the wedge body W receives from the continuous fiber reinforcing material C is minimized, and the wedge body W can be smoothly screwed in. After the wedge body W has been completely screwed in, the continuous fiber reinforcing material tension apparatus 10 is removed. As a result, the end fixing tool T is secured to the fixed structure K under high tension.

The continuous fiber reinforcing material tension apparatus 10 with the configuration described above allows the wedge body W to be reliably secured to the fixed structure K by moving the wedge body W along the continuous fiber reinforcing material C, even if the shape of the outer surface of the continuous fiber reinforcing material C is transferred to the inner wall surface of the wedge body W, and the engaged portion that is to he engaged with the outer surface of the continuous fiber reinforcing material C is formed in the inner wall surface.

The present invention is not limited to the embodiment described above, and various modifications may be made without departing from the gist of the invention.

INDUSTRIAL APPLICABILITY

It is possible to provide a continuous fiber reinforcing material tension apparatus, which allows a wedge body to be reliably secured to a fixed structure by moving the wedge body along a continuous fiber reinforcing material, even if the shape of an outer surface of the continuous fiber reinforcing material is transferred to an inner wall surface of the wedge body, and an engaged portion to be engaged with the outer surface of the continuous fiber reinforcing material is formed in the inner wall surface.

What is claimed is:

1. A continuous fiber reinforcing material tension apparatus that sets a fixing tool to fix a continuous fiber reinforcing material formed by stranding composite wires of continuous fiber to a fixed structure in a tensioned state, the fixing tool including:
   a wedge body that is provided in a terminal side of the continuous fiber reinforcing material and that has a cylindrical shape having an outer diameter that increases from a front end receiving a tensile force toward a rear end of the terminal side, a shape of an outer surface of the continuous fiber reinforcing material being transferred to an inner wall surface of the wedge body to form an engaged portion to be engaged with the outer surface of the continuous fiber reinforcing material; and
   a sleeve that is provided on an outer periphery of the wedge body and that has a conical hollow internal structure having a diameter that increases toward the rear end of the terminal side, the continuous fiber reinforcing material tension apparatus comprising:
   a pressing body that presses the sleeve to a side of the fixed structure and that contains a hollow portion, in which the wedge body is allowed to reciprocate along the continuous fiber reinforcing material;
   a cylindrical bracket located in an opposite side of the sleeve from the pressing body, and having an inner wall surface on which a projection is formed;
   a columnar rotary jig that is allowed to reciprocate inside the bracket, that engages with an end face of the wedge body, that has a spiral groove which engages with the projection, and that applies rotative force around an axis of the continuous fiber reinforcing material; and
   a piston that presses an end face of the rotary jig to the side of the fixed structure.

2. The continuous fiber reinforcing material tension apparatus according to claim 1, wherein a distance in an axial direction which the groove makes one round around the axis of the continuous fiber reinforcing material is equal to a distance in the axial direction between a point of a wire of the continuous fiber reinforcing material and a point where the wire returns to a corresponding position in the circumferential direction.

3. A continuous fiber reinforcing material tension method that sets a fixing tool to fix a continuous fiber reinforcing material formed by stranding composite wires of continuous fiber to a fixed structure in a tensioned state, the fixing tool including:
   a wedge body that is provided in a terminal side of the continuous fiber reinforcing material and that has a cylindrical shape having an outer diameter that increases from a front end receiving a tensile force toward a rear end of the terminal side, a shape of an outer surface of the continuous fiber reinforcing material being transferred to an inner wall surface of the wedge body to form an engaged portion to be engaged with the outer surface of the continuous fiber reinforcing material; and
   a sleeve that is provided on an outer periphery of the wedge body and that has a conical hollow internal structure having a diameter that increases toward the rear end of the terminal side, the continuous fiber reinforcing material tension method comprising:

pressing the sleeve to a side of the fixed structure by a pressing body that contains a hollow portion, in which the wedge body is allowed to reciprocate along the continuous fiber reinforcing material;

applying rotative force around an axis of the continuous fiber reinforcing material using a cylindrical bracket located in an opposite side of the sleeve from the pressing body and having an inner wall surface on which a projection is formed, and using a columnar rotary jig that engages with an end face of the wedge body and that has a spiral groove which engages with the projection; and pressing an end face of the rotary jig to the side of the fixed structure.

4. The continuous fiber reinforcing material tension apparatus according to claim 3, wherein a distance in an axial direction which the groove makes one round around the axis of the continuous fiber reinforcing material is equal to a distance in the axial direction between a point of a wire of the continuous fiber reinforcing material and a point where the wire returns to a corresponding position in the circumferential direction.

* * * * *